United States Patent Office 2,909,566
Patented Oct. 20, 1959

2,909,566

POLYAMIDES

Angelo J. Speziale, Kirkwood, Mo., assignor to Monsanto Chemical Company, St. Louis, Mo., a corporation of Delaware No Drawing. Application September 15, 1955
Serial No. 534,608

12 Claims. (Cl. 260—561)

This application relates to a new class of chemical compounds. In particular this application relates to methods for the preparation of poly functional acetamides by the interaction of polyalkylene polyamines and haloacetyl chlorides.

It is known that α-haloacetamides having small organic substitutents on the amide nitrogen atom are valuable biological toxicants and of special utility as herbicides. All of these known compounds have only a single α-haloacetyl group and may not contain long aliphatic nitrogen substituents.

The primary purpose of this invention is to provide new chemical compounds having utility as herbicides, defoliants and other biological applications. A further purpose of this invention is to provide methods for the preparation of the new and useful compounds. Further purposes will be evident from the following specification.

The new class of chemical compounds have the following structure

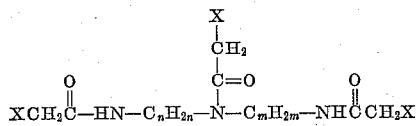

wherein X is a halogen atom and $m$ and $n$ are integers from two (2) to six (6).

The new compounds are prepared by reacting haloacetyl chloride with polyethylene polyamines such as diethylenetriamine, di(trimethylene)triamine, di(1,4-butylene)triamine, di(hexamethylene)triamine, di(1,2-propylene)triamine and other amines having the structure

wherein $m$ and $n$ are integers from two (2) to six (6).

This reaction is conducted by utilizing at least three moles of the haloacetyl chloride, and preferably a slight excess of the three molar equivalents in order to react both of the amino groups as well as the amino group of each molecule, whereby the α-haloacetyl radicals are substituted thereon. The reactions are conducted in the presence of a strong alkali metal hydroxide, such as sodium hydroxide, and preferably at subnormal temperatures, to prevent a too vigorous reaction. The reactions are usually conducted in the presence of an organic liquid, preferably one which dissolves the reactants. The reaction mixture, which has the desired product dissolved thereby is heated, under vacuum if necessary, to evolve the organic liquid reaction medium. The dry residue is then recovered and purified by recrystallization from a suitable solvent.

The new compounds are useful as herbicides and defoliants, and they are also useful as intermediates in the preparation of plasticizers for resinous compositions, and when condensed with poly functional acids, salts, phenols and alcoholates they form resinous alkyd type polymers useful in the preparation of coating compositions, films, fibers and molding compositions.

Further details of the practice of this invention are set forth with respect to the following specific examples.

Example 1

A solution is prepared by dissolving 11.7 grams of the diethylenetriamine in 150 ml. of 1,2-dichloroethane. The reaction flask containing this mixture is cooled to —10° C. and 8.0 grams of chloroacetyl chloride and 124 grams of 20 percent sodium hydroxide solution are added gradually through a dropping funnel. The addition takes two hours and at all times the temperature is maintained below —5° C. After the reaction is complete, the organic layer is separated from the aqueous layer and evaporated to dryness by heating. The dry residue is dispersed in acetone and filtered. The product is identified as α-chloro-N,N'-bis[2-(α-chloroacetamido)ethyl] acetamide which is recrystallized from aqueous ethanol to produce a crystalline solvent having a melting point of 150° C.

Example 2

The procedure of Example 1 is repeated except that 3,3'-imino bis(propylamine) is used in place of diethylenetriamine. The product recovered after reaction with chloroacetyl chloride is identified as α-chloro-N,N'-bis [3-(α-chloroacetamido)propyl]acetamide.

Example 3

The procedure of Example 1 is repeated utilizing as the polyamine, di(hexamethylene)triamine. Reaction with chloroacetyl chloride in the presence of sodium hydroxide produces a compound which is identified as α-chloro - N,N' - bis[6-(α-chloroacetamido)hexyl]acetamide.

Example 4

The procedure of Example 1 is repeated using as the polyamine di(1,2-propylene)triamine. The reaction by means of chloroacetyl chloride in the presence of sodium hydroxide is conducted in a toluene solution. Upon the evaporation of the solvent medium a solid compound identified as α-chloro-N,N'-bis[2-(α-chloroacetamido)-propyl] acetamide is recovered.

By utilizing α-bromoacetyl chloride in place of the chloroacetyl chloride, the corresponding bromine derivatives are prepared. The iodo compounds having similar utility may be prepared by heating the corresponding α-bromo or α-chloro derivatives in a solution of potassium iodide. The bromo and iodo analogues are also useful preemergence and contact herbicides and especially effective as defoliants.

What is claimed is:

1. The compound α-chloro-N,N'-bis[2-(α-chloroacetamido)ethyl] acetamide.

2. The compound α-chloro-N,N'-bis[3-(α-chloroacetamido)propyl] acetamide.

3. The compound α-chloro-N,N'-bis[6-(α-chloroacetamido)hexyl] acetamide.

4. The compound α-chloro-N,N'-bis[2-(α-chloroacetamido)propyl] acetamide.

5. The method defined by claim 11 wherein diethylenetriamine is reacted with chloroacetyl chloride.

6. The method of claim 11 wherein 3,3'-amino-bis-(propyl)amine is reacted with chloroacetyl chloride.

7. The method of claim 11 wherein di(hexamethylene)triamine is reacted with chloroacetyl chloride.

8. The method of claim 11 wherein di(1,2-propylene)-triamine is reacted with chloroacetyl chloride.

9. A compound having the structure:

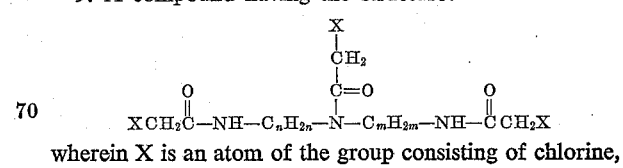

wherein X is an atom of the group consisting of chlorine, iodine and bromine; and wherein $m$ and $n$ are integers from two (2) to six (6).

10. A compound having the structure:

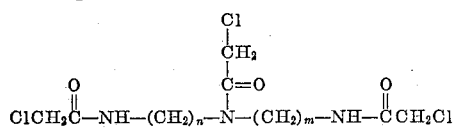

wherein $m$ and $n$ are integers from two (2) to six (6).

11. A method of preparing compounds of the structure:

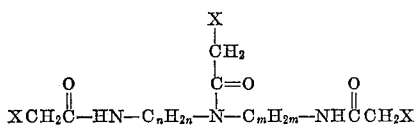

wherein X is a halogen atom of the group consisting of chlorine, iodine and bromine, and $m$ and $n$ are integers from two (2) to six (6) which comprises contacting polyamines of the structure

wherein $m$ and $n$ are integers from two (2) to six (6) with haloacetyl chloride in the presence of an alkali metal hydroxide and separating the resulting product from the reaction medium.

12. A method of preparing compounds of the structure:

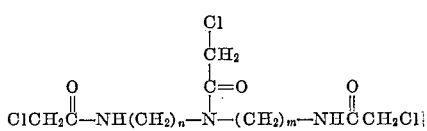

wherein $m$ and $n$ are integers from two (2) to six (6) which comprises contacting polyamines of the structure:

wherein $m$ and $n$ are integers from two (2) to six (6) with haloacetyl chloride in the presence of an alkali metal hydroxide and separating the resulting product from the reaction medium.

References Cited in the file of this patent

UNITED STATES PATENTS

| | | |
|---|---|---|
| 2,176,896 | Epstein et al. | Oct. 24, 1939 |
| 2,337,313 | D'Alelio | Dec. 21, 1943 |
| 2,338,177 | Graenacher et al. | Jan. 4, 1944 |
| 2,338,178 | Graenacher et al. | Jan. 4, 1944 |
| 2,390,766 | Yellhoefer et al. | Dec. 11, 1945 |
| 2,516,674 | Bruce et al. | July 25, 1950 |
| 2,569,409 | De Benneville et al. | Sept. 25, 1951 |
| 2,647,121 | Jacoby | July 28, 1953 |
| 2,711,415 | Cottle et al. | June 21, 1955 |

UNITED STATES PATENT OFFICE

CERTIFICATE OF CORRECTION

Patent No. 2,909,566                            October 20, 1959

Angelo J. Speziale

It is hereby certified that error appears in the printed specification of the above numbered patent requiring correction and that the said Letters Patent should read as corrected below.

Column 1, line 51, for "amino", second occurrence, read -- imino --.

Signed and sealed this 14th day of June 1960.

(SEAL)
Attest:

KARL H. AXLINE

Attesting Officer

ROBERT C. WATSON

Commissioner of Patents